(12) United States Patent
Yao et al.

(10) Patent No.: US 11,686,372 B2
(45) Date of Patent: Jun. 27, 2023

(54) MODULARIZED COAXIAL GEAR SET REDUCTION MECHANISM

(71) Applicant: Li-Ho Yao, Taipei (TW)

(72) Inventors: Li-Ho Yao, Taipei (TW); Norman Lien, Taipei (TW); Pei-Sheng Hsieh, Taipei (TW); Chi-Chen Tien, Taipei (TW); Pi-Jen Hsieh, Taipei (TW)

(73) Assignee: Li-Ho Yao, Taipei (TW)

( * ) Notice: Subject to any disclaimer, the term of this patent is extended or adjusted under 35 U.S.C. 154(b) by 0 days.

(21) Appl. No.: 17/558,609

(22) Filed: Dec. 22, 2021

(65) Prior Publication Data
US 2022/0196118 A1 Jun. 23, 2022

(30) Foreign Application Priority Data
Dec. 23, 2020 (TW) .................................. 109145767

(51) Int. Cl.
*F16H 1/46* (2006.01)
*F16C 3/02* (2006.01)
*F16H 57/023* (2012.01)
*F16H 1/28* (2006.01)

(52) U.S. Cl.
CPC ................. *F16H 1/46* (2013.01); *F16C 3/02* (2013.01); *F16H 57/023* (2013.01); *F16H 2001/2872* (2013.01)

(58) Field of Classification Search
CPC ................................. F16H 1/46; F16H 57/023
See application file for complete search history.

(56) References Cited

U.S. PATENT DOCUMENTS 10,876,596 B1 * 12/2020 Bonny .................. F16D 65/186

\* cited by examiner

*Primary Examiner* — Derek D Knight
(74) *Attorney, Agent, or Firm* — Leong C. Lei

(57) ABSTRACT

A mechanism includes a housing, a transmission axle arranged at a center of the housing, an internally toothed ring track fixed to an inner circumference of the housing, and a coaxial gear set arranged between the transmission axle and the internally toothed ring track. The coaxial gear set includes a sun gear, a planetary gear set, and an output member. The planetary gear set includes a first carrier frame and a second carrier frame rotatably arranged at two ends of the sun gear. Multiple planetary gears are rotatably arranged between the first and second carrier frames and around the sun gear. Each of the planetary gears is in meshing engagement with the output member. The coaxial gear set is made in a modularized form for subsequent assembly in an optional manner, so as to provide an efficacy of easing assembling and servicing operations.

12 Claims, 9 Drawing Sheets

MODULARIZED COAXIAL GEAR SET REDUCTION MECHANISM

TECHNICAL FIELD OF THE INVENTION

The present invention relates to a modularized coaxial gear set reduction mechanism that features modularization of a majority of components thereof so as to ease assembling, servicing, and inventory management of the reduction mechanism.

DESCRIPTION OF THE PRIOR ART

A prior art planetary gear based reducer is structured such that components, such as a sun gear, a carrier frame, planetary gears, and an output member, are sequentially mounted to an input axle. As shown in FIG. 1, the planetary gear based reduction mechanism is made up of a planetary gear carrier frame 85, a sun gear 80, a plurality of planetary gears 86, and an internally toothed ring 90, and a housing 95, wherein the internally toothed ring 90 is combined with the housing 95, while the planetary gear carrier frame 85, the sun gear 80, and the planetary gears 86 are received in an interior of the combination of the internally toothed ring 90 and the housing 95. The sun gear 80 includes a transmission axle 81. Each of the planetary gears 86 is in meshing engagement with an outer circumference of the sun gear 80 and an inner circumference of the internally toothed ring 90. The planetary gears 86 are mounted on the planetary gear carrier frame 85.

Such a known reduction structure has drawbacks in respect of complicated assembly, insufficient accuracy, and deviation of concentricity. To overcome the inconvenience of the prior art in respect of servicing and inventory management that result from complicated assembling and a large number of processes involved, and also for handling deficiency of concentricity after being assembled, the machining precision of each component must be heightened and as such, the difficulty of machining and assembling is also increased, leading to an increase of overall cost of fabrication. On the other hand, if the machining precision is lowered, situations such as unsecured assembly and poor gear engagement may incur, leading to issues of noise and poor transmission efficiency for operation thereof.

SUMMARY OF THE INVENTION

The primary objective of the present invention is to make a majority of components modularized, in order to ease assembling, servicing, and inventory management of a reduction mechanism.

A second objective of the present invention is to enhance the concentricity of a reduction mechanism after being assembled, and to reduce the difficulty of machining and assembling, to thereby further lower down overall cost of fabrication.

A further objective of the present invention is to ensure high concentricity after assembly for making the entire assembled structure of a reduction mechanism more stable and more secured and enhancing the degree of meshing engagement, so as to reduce vibration and noise in operation thereof, to thereby extend the service life thereof and also to improve the transmission efficiency.

DETAILED DESCRIPTION OF THE PREFERRED EMBODIMENT

Figure 1:
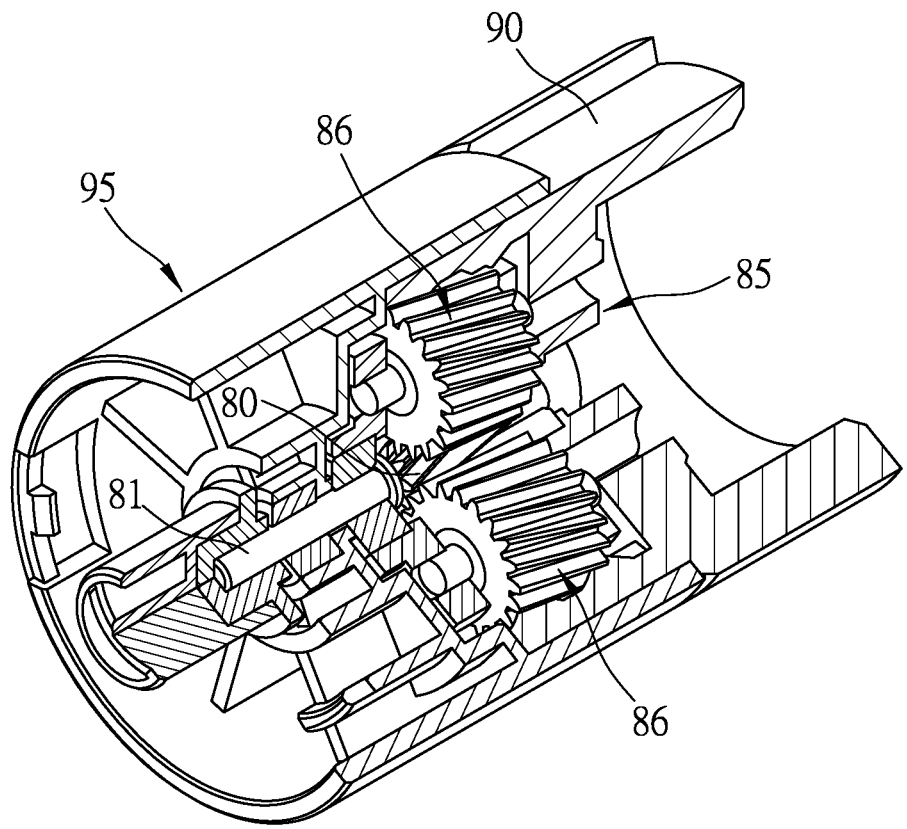
FIG. 1 is a perspective view, partly sectioned, showing a prior art reduction mechanism.
Figure 2:
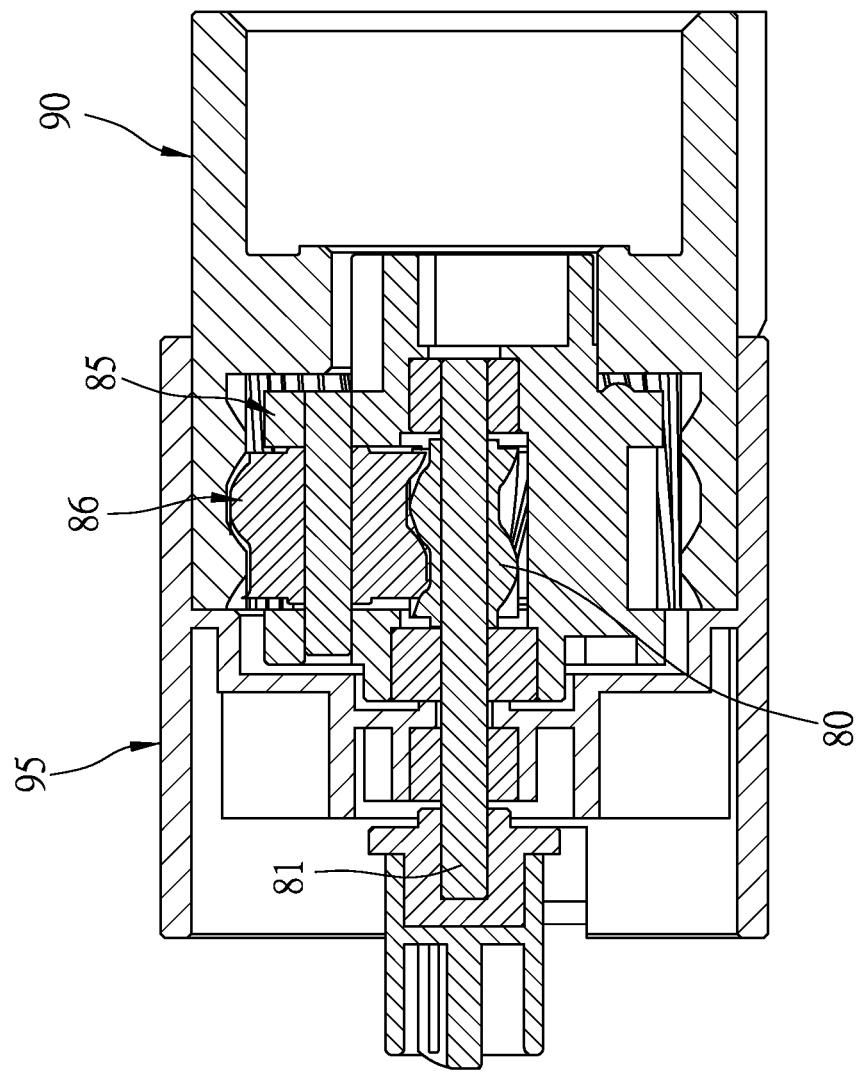
FIG. 2 is a cross-sectional view showing the prior art reduction mechanism.
Figure 3:
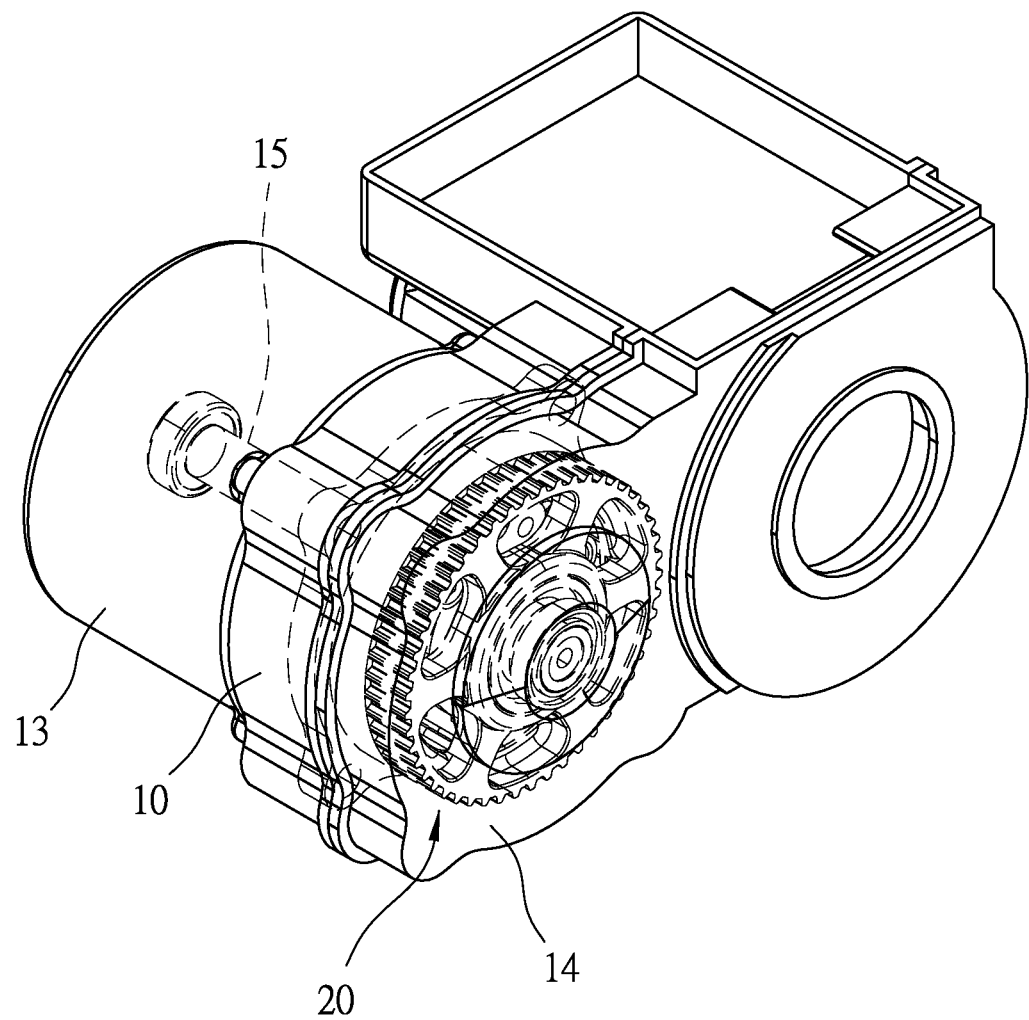
FIG. 3 is a perspective view showing the present invention.
Figure 4:
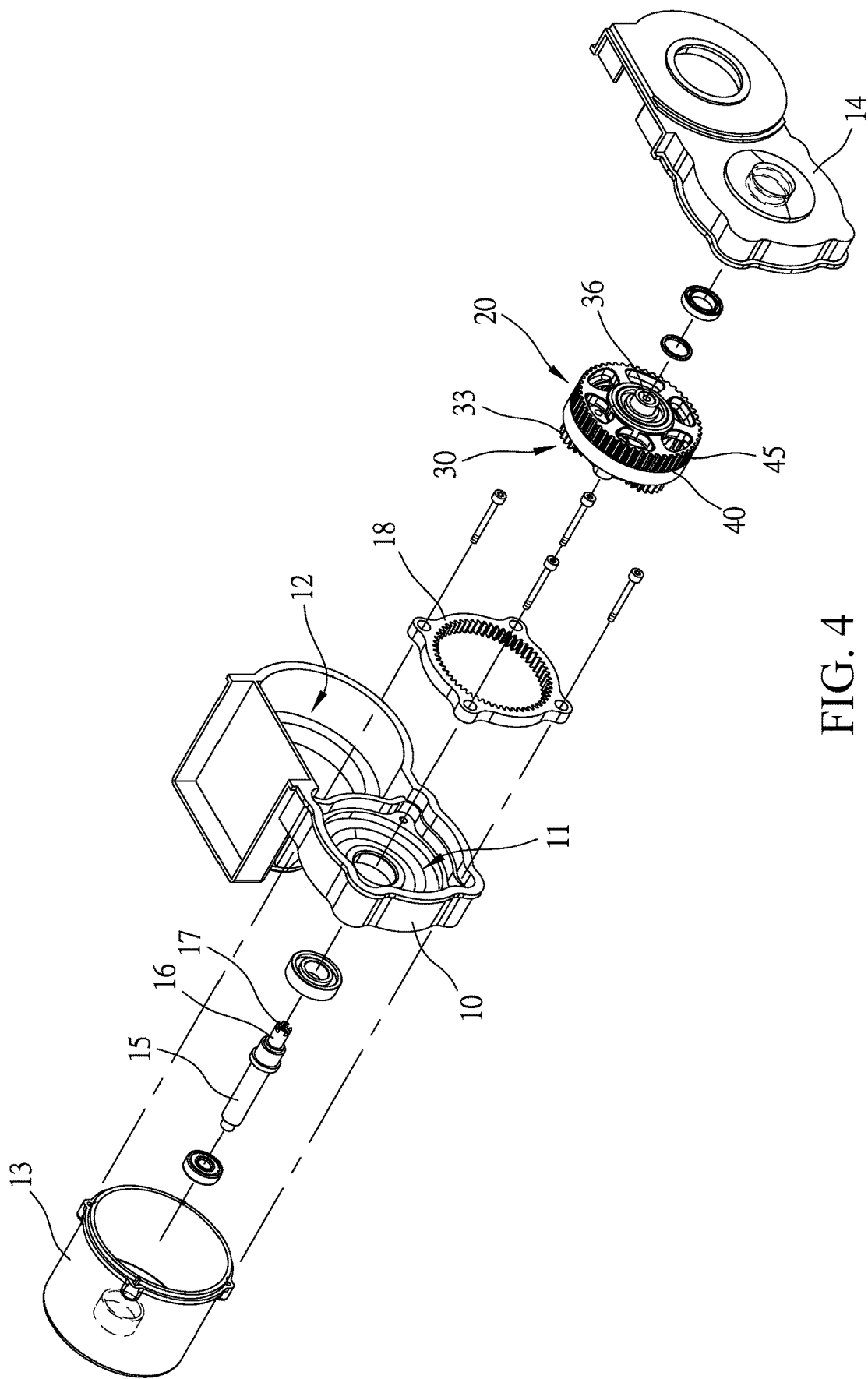
FIG. 4 is an exploded view showing the present invention.

A structure of the present invention, as shown in FIGS. 3 and 4, is made up of a housing 10, a transmission axle 15 arranged at a center of the housing 10, an internally toothed ring track 18 arranged on an inner circumference of the housing 10, and a coaxial gear set 20 arranged between the transmission axle 15 and the internally toothed ring track 18.

Figure 5:
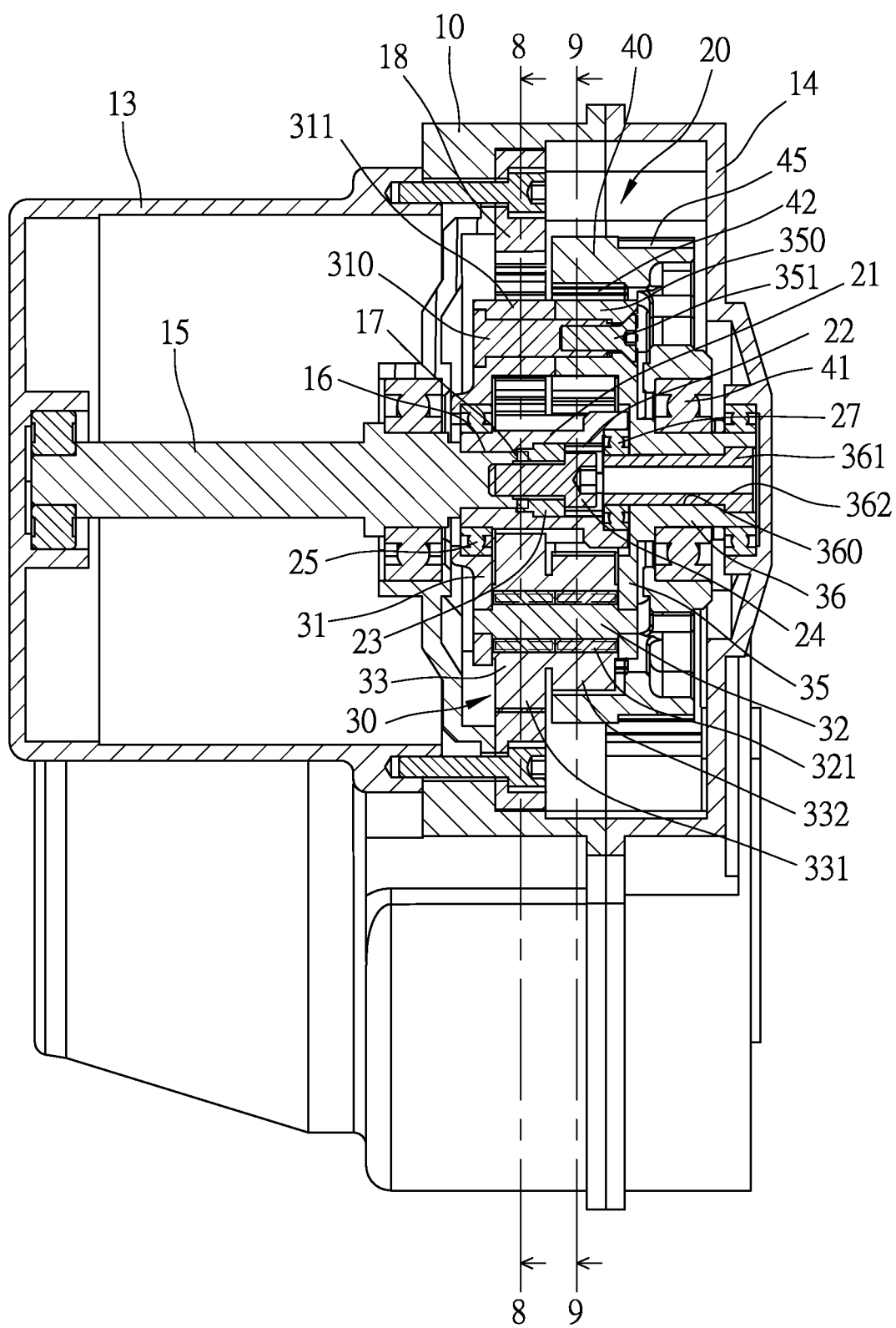
FIG. 5 is a cross-sectional view showing the present invention in an assembled form.

For a detailed structure of a preferred embodiment according to the present invention, reference being had to FIGS. 4 and 5, the housing 10 includes a first mounting compartment 11 and a second mounting compartment 12. The first mounting compartment 11 is provided for mounting the transmission axle 15 and the coaxial gear set 20 that is arranged on the transmission axle 15, while the second mounting compartment 12 is provided for disposition of a driven member (not shown in the drawings) in meshing engagement with the coaxial gear set 20. The housing 10 is provided, at a front end and a rear end thereof, respectively, with a first cover 13 and a second cover 14 fastened thereto and covering thereon for protection of internal components arranged therein. Two ends of the transmission axle 15 are rotatably mounted, as being each supported by a bearing, to the housing 10 and the first cover 13. The end of the transmission axle 15 that extends outside of the housing 10 is formed with a mounting section 16 and a coupling section 17 for mounting the coaxial gear set 20 thereon to realize an operative coupling relationship therebetween. The internally toothed ring track 18 is fixed to an inner circumference of the first mounting compartment 11 of the housing 10 at a location corresponding to a site where the transmission axle 15 penetrates therethrough.

Figure 6:
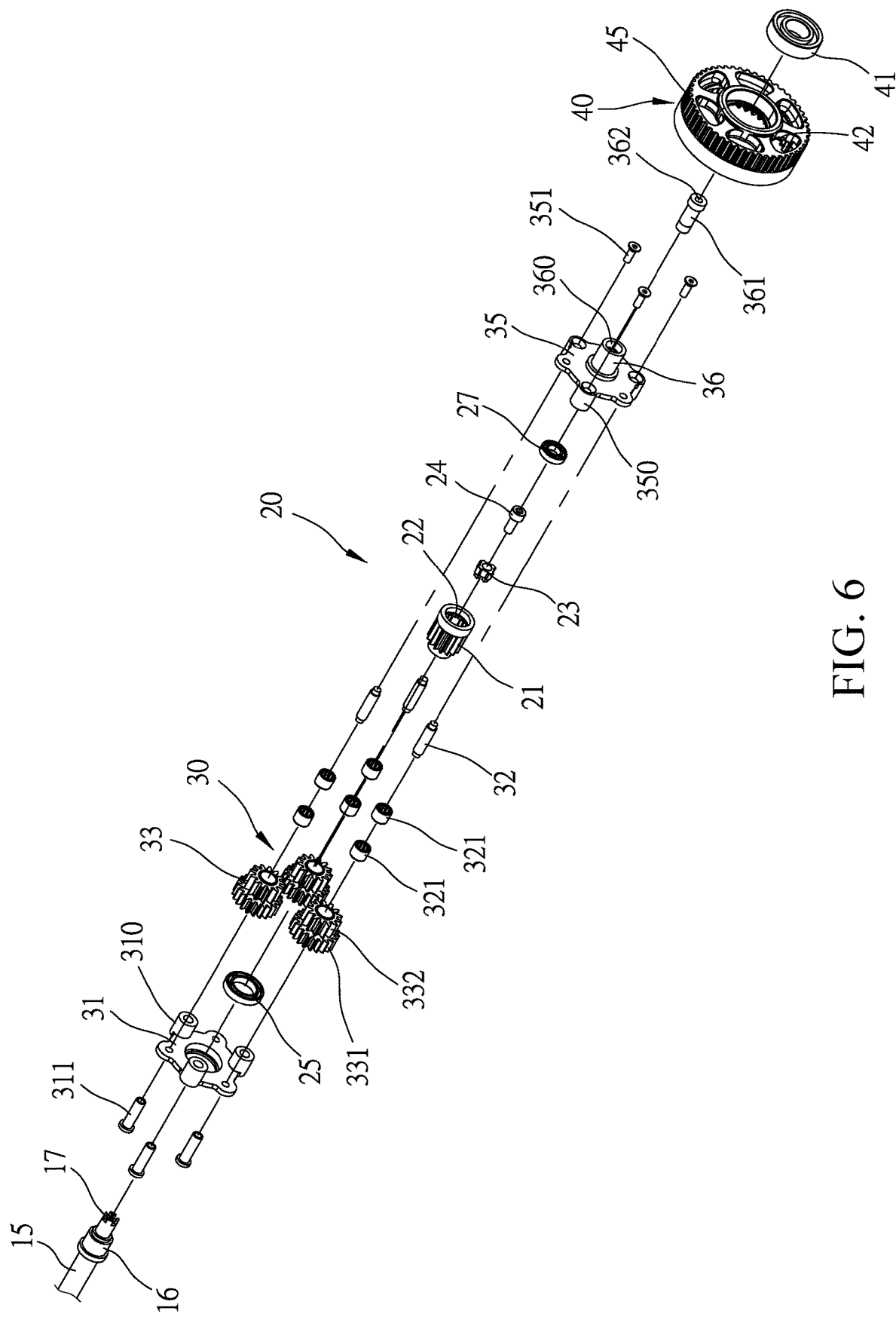
FIG. 6 is an exploded view showing a coaxial gear set of the present invention.
Figure 7:
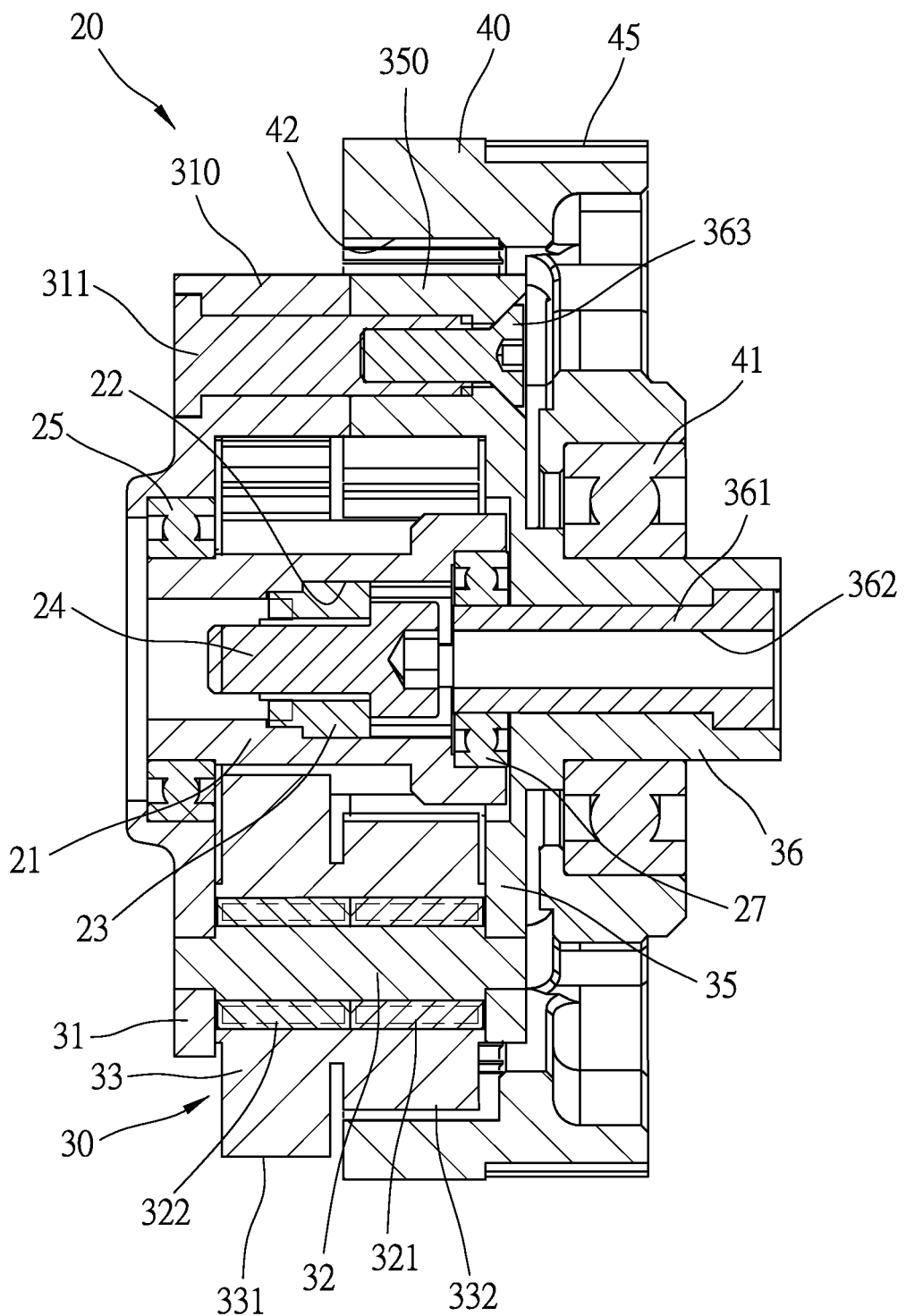
FIG. 7 is a cross-sectional view showing the coaxial gear set of the present invention.
Figure 8:
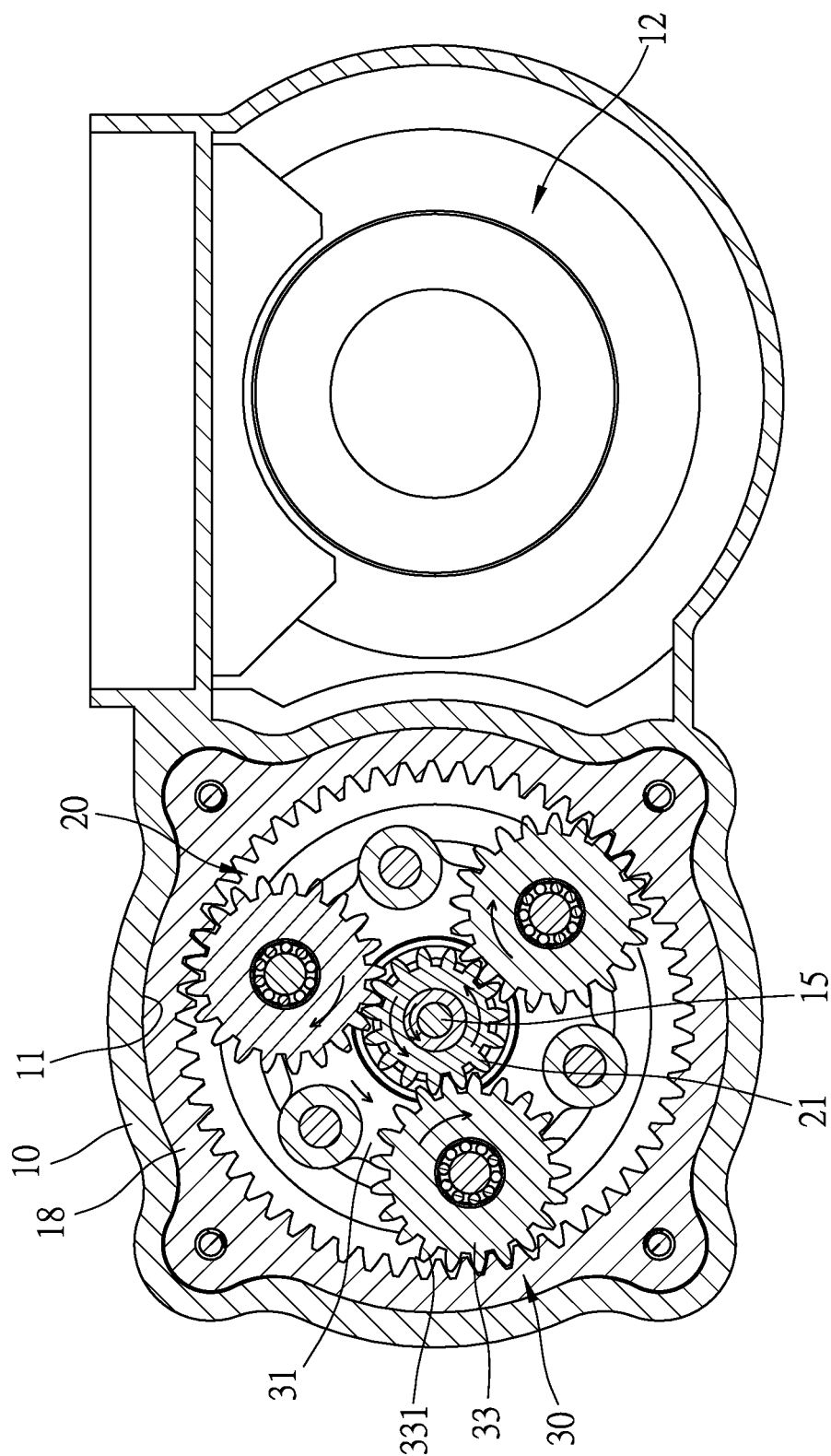
FIG. 8 is a cross-sectional view of the present invention taken along line 8-8 of FIG. 7.
Figure 9:
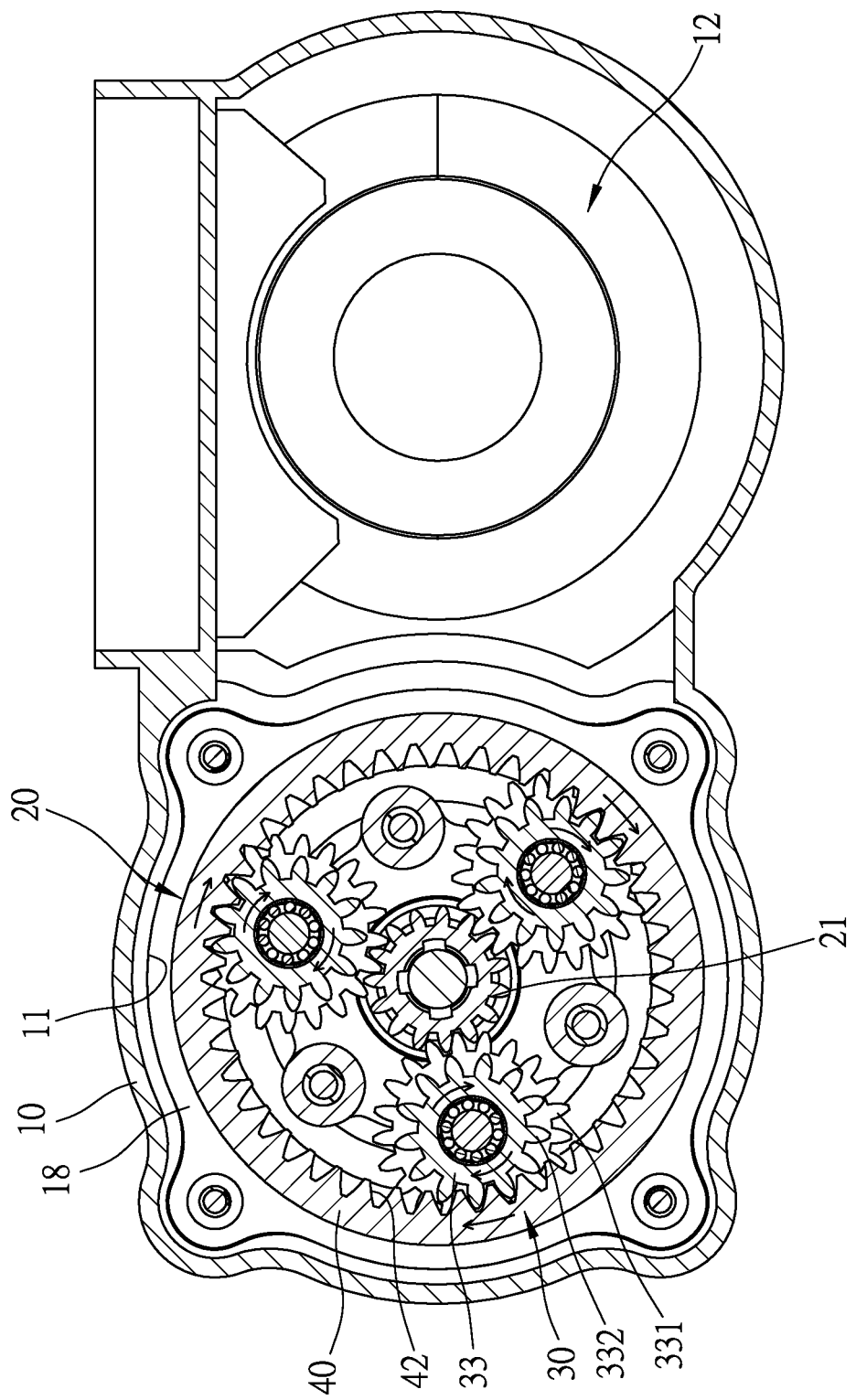
FIG. 9 is a cross-sectional view of the present invention taken along line 9-9 of FIG. 7.

For a detailed structure of the coaxial gear set 20, reference being had to FIGS. 6 and 7, the coaxial gear set 20 comprises a modularized structure formed of a sun gear 21, a planetary gear set 30, and an output member 40, wherein the sun gear 21 is formed with a coupling hole 22 that is fit over the mounting section 16 of the transmission axle 15, and a coupling block 23 is inserted into and disposed in the coupling hole 22 to engage with the coupling section 17 of the transmission axle 15. A fastening member 24 penetrates through and presses on the coupling block 23 and is then fastened to the transmission axle 15 (as shown in FIG. 5), so that the coaxial gear set 20 is selectively mounted to the mounting section 16 of the transmission axle 15 by means of the sun gear 21. Two ends of the sun gear 21 are respectively provided with a first bearing 25 and a second bearing 27 in order to rotatably mount the planetary gear set 30. The planetary gear set 30 comprises a first carrier frame 31, a second carrier frame 35, and a plurality of planetary gears 33 that mesh with and surround the sun gear 21, wherein the first carrier frame 31 is mounted by the first bearing 25 to one of the ends of the sun gear 21, and the second carrier frame 35 is provided, at a center thereof, with an axle tube 36 for mounting the output member 40, and a free end of the axle tube 36 is rotatably mounted, by means of a bearing, to the second cover 14. Further, the axle tube 36 of the second carrier frame 35 is provided, at a center thereof, with a stepped mounting hole 360 that receives an end of a mounting axle 361 to penetrate therethrough for pressing thereon, such that an end of the mounting axle 361 is mounted, by means of the second bearing 27, to an opposite one of the ends of the sun gear 21. The mounting axle 361 is formed with a through hole 362, which receives a hand tool to insert therein for operating the fastening member 24 of the coupling block 23 of the sun gear 21. Surfaces of the first and second carrier frames 31, 35 that face each other are respectively provided with a plurality of counterbored-hole pillars 310, 350, which are set in abutting engagement with each other and respectively receive threaded fastening elements 311, 351 to penetrate therethrough for mutually fastening to each other, so as to have the first and second carrier frames 31, 35 on the sun gear 21 to attach to each other as a unity. A plurality of axle bars 32 are arranged between the first and second carrier frames 31, 35 for mounting the planetary gears 33. Each of the axle bars 32 rotatably supports a corresponding one of the planetary gears 33 by means of at least one bearing 321. Each of the planetary gears 33 includes a first toothed portion 331 (as shown in FIG. 8) that simultaneously mesh with both the sun gear 21 and the internally toothed ring track 18, and each of the planetary gears 33 is provided with a second toothed portion 332 (as shown in FIG. 9) located at one side of and integrated with the first toothed portion 331 to mesh with the output member 40, so that the sun gear 21 of the coaxial gear set 20 may simultaneously drive the first toothed portions 331 of the planetary gears 33, and as being constrained by the internally toothed ring track 18, the planetary gears 33 are forced to generate spinning and orbiting motions. Further, the second toothed portions 332 of the planetary gears 33 synchronously drive the output member 40, and the output member 40 is rotatably mounted, by means of a third bearing 41, to the axle tube 36 of the second carrier frame 35 of the planetary gear set 30. The output member 40 is formed, on an inner circumference thereof, with an internal toothed circumference 42 that is engageable with the second toothed portions 332 of the planetary gears 33 of the planetary gear set 30, and the output member 40 is formed, on an outer circumference thereof, with a driving wheel portion 45 that is engageable with the driven member (not shown in the drawings). The driving wheel portion 45 can be an externally toothed wheel or a frictional wheel, and in the present invention, an externally toothed wheel is taken as an example for the driving wheel portion 45 of the output member 40.

As such, the coaxial gear set 20 can be assembled in advance, and is selectively mountable to the transmission axle 15 of the housing 10 to be in meshing engagement with the internally toothed ring track 18 to thereby form a modularized coaxial gear set reduction mechanism.

An actual operation of the present invention will be described. As shown in FIGS. 3, 4, and 5, since the sun gear 21 of the coaxial gear set 20 receives the planetary gear set 30 and the output member 40 to mount thereon 21, the coaxial gear set 20 can be pre-assembled as a modularized unity structure in a workshop, so that an operator is allowed to have the coaxial gear set 20 completely mounted on the transmission axle 15 in a one-time operation by means of the sun gear 21, with the first toothed portions 331 of the planetary gears 33 of the planetary gear set 30 of the coaxial gear set 20 being put into engagement with the internally toothed ring track 18 of the housing 10, and the transmission axle 15, when being driven, may synchronously drive the sun gear 21 of the coaxial gear set 20 so as to cause the sun gear 21 to synchronously drive the planetary gear set 30, and due to the first toothed portions 331 of the planetary gears 33 being in engagement with the internally toothed ring track 18 (as shown in FIG. 8), the planetary gears 33 are spinning while synchronously orbiting around the sun gear 21. Further, since for each of the planetary gears 33, the second toothed portion 332 in formed as an integrated structure with the first toothed portion 331, and the second toothed portion 332 of each of the planetary gears 33 is in meshing engagement with the output member (as shown in FIG. 9), the planetary gears 33 may drive, in a synchronized manner, the output member 40 to then drive the driven member (not shown in the drawings).

Based on the design and description provided above, the present invention provides that the coaxial gear set 20 is mounted, in an optional way, on the transmission axle 15 of the housing 10, so that an efficacy of easing assembling and servicing is achieved, and also, inventory management is simplified to thereby reduce the space for storage and thus lowering down the difficulty and cost of assembling. Further, the sun gear 21, the planetary gears 33, and the output member 40 are mountable, in the formed of a modularized coaxial gear set 20, to the transmission axle 15, so that accumulation of is reduced and the degree of concentricity of the assembled reduction mechanism, so as to make the entire assembled structure of the reduction mechanism more secured and the degree of meshing enhanced to thereby reduce vibration and noise generated in the operation and extend the service life thereof and improve the transmission efficiency.

We claim:

1. A modularized coaxial gear set reduction mechanism, comprising:
   a housing;
   a transmission axle, which is rotatably mounted in the housing;
   an internally toothed ring track, which is fixed to the housing;
   a coaxial gear set, which comprises a sun gear, a planetary gear set, and an output member, wherein the sun gear is selectively mountable to and connected to the transmission axle to rotate in unison therewith; the planetary gear set is arranged, in a rotatable manner, between two ends of the sun gear, and the planetary gear set is simultaneously in meshing engagement with the sun gear and the internally toothed ring track; and the output member is arranged at one side of the planetary gear set that is opposite to the internally toothed ring track, and the output member is drivable by the planetary gear set;
   wherein the housing comprises at least a first mounting compartment for mounting the transmission axle and the coaxial gear set, the housing having a front end and a rear end that are respectively covered by a first cover and a second cover mounted thereto, two ends of the transmission axle being rotatably mounted, as being each supported by a bearing, between the housing and the first cover.

2. The modularized coaxial gear set reduction mechanism according to claim 1, wherein one end of the transmission axle is formed with a mounting section and a coupling section, and the sun gear of the coaxial gear set is formed, in a center thereof, with a coupling hole that is fit over the mounting section, a coupling block being inserted into and disposed in the coupling hole to engage with the coupling section of the transmission axle, a fastening member penetrating through and pressing on the coupling block to then fasten to the transmission axle.

3. The modularized coaxial gear set reduction mechanism according to claim 1, wherein the planetary gear set of the coaxial gear set comprises a first carrier frame and a second carrier frame that are opposite to each other and are respectively and rotatably arranged at two ends of the sun gear, a plurality of planetary gears being rotatably arranged between the first and second carrier frames and around an outer circumference of the sun gear, each of the planetary gears comprising a first toothed portion synchronously meshing with the sun gear and the internally toothed ring track, each of the planetary gears further comprising a second toothed portion meshing with the output member, the output member being rotatably mounted on the second carrier frame of the planetary gear set.

4. The modularized coaxial gear set reduction mechanism according to claim 3, wherein the two ends of the sun gear respectively receive the first and second carrier frames of the planetary gear set to rotatably mount thereto by means of a first bearing and a second bearing.

5. The modularized coaxial gear set reduction mechanism according to claim 4, wherein the second carrier frame of the planetary gear set is provided, at a center thereof, with an axle tube for mounting the output member, and the axle tube receives the output member to rotatably mount thereto by means of a third bearing.

6. The modularized coaxial gear set reduction mechanism according to claim 5, wherein the axle tube of the second carrier frame is provided, in a center thereof, with a stepped mounting hole that receives a mounting axle to penetrate therein, and one end of the mounting axle is rotatably mounted on an opposite end of the sun gear, wherein the mounting axle is formed with a through hole.

7. The modularized coaxial gear set reduction mechanism according to claim 3, wherein the second carrier frame of the planetary gear set is provided, at a center thereof, with an axle tube for mounting the output member, and the axle tube receives the output member to rotatably mount thereto by means of a third bearing.

8. The modularized coaxial gear set reduction mechanism according to claim 7, wherein the axle tube of the second carrier frame is provided, in a center thereof, with a stepped mounting hole that receives a mounting axle to penetrate therein, and one end of the mounting axle is rotatably mounted on an opposite end of the sun gear, wherein the mounting axle is formed with a through hole.

9. The modularized coaxial gear set reduction mechanism according to claim 3, wherein surfaces of the first and second carrier frames of the planetary gear set that face each other are respectively provided with a plurality of counter-bored-hole pillars, which are set in abutting engagement with each other and respectively receive threaded fastening elements to penetrate therethrough for mutually fastening to each other, so as to have the first and second carrier frames on the sun gear to attach to each other as a unity.

10. The modularized coaxial gear set reduction mechanism according to claim 3, wherein a plurality of axle bars are arranged between the first and second carrier frames for mounting the planetary gears, and each of the axle bars receives a corresponding one of the planetary gears to rotatably mount thereto by means of at least one bearing.

11. The modularized coaxial gear set reduction mechanism according to claim 3, wherein the output member has an inner circumference that is formed with an internal toothed circumference engageable with the second toothed portion of each of the planetary gears, and the output member has an outer circumference that is formed with a driving wheel portion for driving purposes.

12. The modularized coaxial gear set reduction mechanism according to claim 11, wherein the driving wheel portion of the outer circumference of the output member includes an externally toothed wheel or a frictional wheel.

* * * * *